United States Patent [19]
Müller

[11] Patent Number: 5,641,403
[45] Date of Patent: Jun. 24, 1997

[54] SEPARATING MATERIALS FOR HYDROPHOBIC CHROMATOGRAPHY

[75] Inventor: Egbert Müller, Erzhausen, Germany

[73] Assignee: Merck Patent Gesellschaft mit Beschrankter Haftung, Darmstadt, Germany

[21] Appl. No.: 583,039

[22] PCT Filed: Jul. 4, 1994

[86] PCT No.: PCT/EP94/02182

§ 371 Date: Jan. 16, 1996

§ 102(e) Date: Jan. 16, 1996

[87] PCT Pub. No.: WO95/02820

PCT Pub. Date: Jan. 26, 1995

[30] Foreign Application Priority Data

Jul. 16, 1993 [DE] Germany .................. 43 23 913.7

[51] Int. Cl.⁶ .................................................. B01D 15/08
[52] U.S. Cl. .................. 210/635; 210/656; 210/198.2; 210/502.1
[58] Field of Search .................. 210/635, 656, 210/198.2, 502.1; 502/401, 402, 404, 439

[56] References Cited

U.S. PATENT DOCUMENTS 3,663,263  5/1972  Bodre ....................... 210/198.2
3,808,125  4/1974  Good ........................ 210/198.2

(List continued on next page.)

FOREIGN PATENT DOCUMENTS 1814598  12/1968  Germany ................ 210/198.2
468814   3/1993   Sweden .................. 210/198.2

OTHER PUBLICATIONS

Derwent Abstract of Japan Patent 62 267 663 vol. 12 No. 147 (P–698) May 1988.

*Primary Examiner*—Ernest G. Therkorn
*Attorney, Agent, or Firm*—Millen, White, Zelano & Branigan, P.C.

[57] ABSTRACT

The invention concerns stationary phases for use in hydrophobic interaction chromatography, the stationary phases being based on hydroxy-group-containing support materials on whose surfaces polymers are covalently bound. The stationary phases are characterized in that:
a) the support material contains aliphatic hydroxy groups;
b) the polymers are covalently bound to the support material through a terminal monomer unit;
c) the polymers contain monomer units of formula (II)

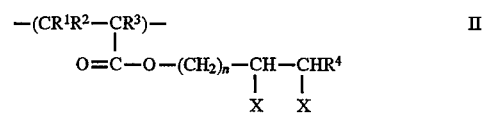

in which
$R^1$, $R^2$ and $R^3$ are, independently of each other, H or $CH_3$,
$R^4$ is H, $C_1$–$C_5$-alkyl or $C_6$–$C_{12}$-aryl,
n is an integer between 1 and 5,
one X radical is OH and the other X radical is Z—$R^5$,
Z is O or NH,
and
$R^5$ is $C_1$–$C_{20}$-alkyl, $C_6$–$C_{25}$-aryl, $C_7$–$C_{25}$-alkylaryl or $C_7$–$C_{25}$-arylalkyl which is optionally derivatized, once or more than once, with nitrile or $C_1$–$C_5$-alkoxy, where one or more non-adjacent $CH_2$ groups are optionally replaced by NH or O or else one or more CH groups are optionally replaced by N, or
$R^5$ is —[$(CH_2)_m$—O—]$_o$—$R^6$
in which
m is 2 or 3,
o is an integer between 1 and 200
and
$R^6$ is H or $C_1$–$C_5$-alkyl;
d) the monomer units are linked together linearly.

The invention also concerns methods of preparing such stationary phases and their use in the chromatographic separation of mixtures of substances.

10 Claims, 1 Drawing Sheet

U.S. PATENT DOCUMENTS

| | | | |
|---|---|---|---|
| 4,029,583 | 6/1977 | Ho Chang | 210/198.2 |
| 4,045,353 | 8/1977 | Kosaka | 55/386 |
| 4,140,653 | 2/1979 | Imura | 210/198.2 |
| 4,202,775 | 5/1980 | Abe | 210/287 |
| 4,246,351 | 1/1981 | Miyake | 210/692 |
| 4,324,689 | 4/1982 | Shah | 210/198.2 |
| 4,330,440 | 5/1982 | Ayers | 210/198.2 |
| 4,332,694 | 6/1982 | Kalal | 435/180 |
| 4,335,226 | 6/1982 | Muller | 210/656 |
| 4,352,884 | 10/1982 | Nakashima | 210/198.2 |
| 4,406,870 | 9/1983 | Miyake | 210/681 |
| 4,415,631 | 11/1983 | Schutijser | 210/198.2 |
| 4,551,245 | 11/1985 | Ramsden | 210/198.2 |
| 4,710,525 | 12/1987 | Kraemer | 523/201 |
| 4,737,533 | 4/1988 | Charmot | 264/311.11 |
| 4,756,834 | 7/1988 | Muller | 210/635 |
| 4,767,529 | 8/1988 | Boos | 210/198.2 |
| 4,829,101 | 5/1989 | Kraemer | 523/201 |
| 4,882,048 | 11/1989 | Blaschke | 210/198.2 |
| 4,882,226 | 11/1989 | Schutyser | 210/198.2 |
| 4,937,000 | 6/1990 | Bomer | 210/656 |

SEPARATING MATERIALS FOR HYDROPHOBIC CHROMATOGRAPHY

The invention relates to separating materials for hydrophobic chromatography.

BACKGROUND OF THE INVENTION

Two groups of separating materials are customary for liquid chromatography which is based on hydrophobic interactions:

a) Separating materials for reversed phase chromatography (RP-chromatography), which have a high ligand density, are mainly used for separating low molecular weight substances in non-aqueous eluents.

b) Separating materials for hydrophobic interaction chromatography (HIC), which have lower ligand densities, and which in general have ligands of lower hydrophobicity (e.g. $C_4$-alkyl or $C_7$-aryl, instead of $C_8$-alkyl or $C_{18}$-alkyl as in RP chromatography), are mainly employed for separating proteins using aqueous eluents. A chaotropic salt, for example 2M ammonium sulfate, is added to the starting eluent; the salt concentration is decreased during the course of the gradient.

Separating materials for hydrophobic interaction chromatography are known in the state of the art. Polysaccharides, which can also be cross-linked, and also cross-linked poly(methyl)acrylates, are customarily used as basal supports. In each case, the basal supports are substituted by lower alkyl or aryl radicals, for example by butyl, phenyl or benzyl. A known process for preparing these materials is based on reacting a basal support which contains oxirane groups with an alcohol in the presence of boron trifluoride etherate.

An inadequate separating effect is frequently observed when using separating materials which are known from the state of the art. Additional, frequently observed, disadvantages of these materials are diminution in the biological activity and/or losses due to non-specific irreversible binding of the analyte.

SUMMARY OF THE INVENTION

The object of the present invention is to provide separating materials having improved properties, in particular for hydrophobic interaction chromatography.

Application DE 43 10 964 discloses oxirane-containing activated support materials in which monomers of the formula I are grafted onto a hydroxyl group-containing basal support,

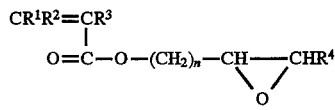   I in which $R^1$, $R^2$ and $R^3$ are, independently of each other, H or $CH_3$, $R^4$ is H, $C_1$–$C_5$-alkyl or $C_6$–$C_{12}$-aryl, and n is an integer between 1 and 5.

It has been found that these activated support materials can be converted, in a manner known per se, into separating materials for hydrophobic interaction chromatography. The resulting separating materials exhibit improved properties.

The invention consequently relates to separating materials for hydrophobic chromatography based on hydroxyl group-containing basal supports onto whose surfaces polymers are covalently bonded, characterized in that a) the basal support contains aliphatic hydroxyl groups, b) the covalently bonded polymers are bonded to the basal support by way of a terminal monomer unit, c) the polymers contain monomer units of the formula II, d) the monomer units are linked linearly,

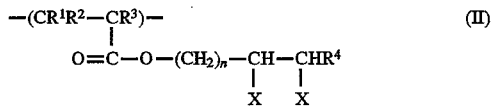   (II)

in which $R^1$, $R^2$ and $R^3$ are, independently of each other, H or $CH_3$, $R^4$ is H, $C_1$–$C_5$-alkyl or $C_6$–$C_{12}$-aryl, n is an integer between 1 and 5, one X radical is OH and the other X radical is Z—$R^5$, Z is O or NH, and $R^5$ is $C_1$–$C_{20}$-alkyl, $C_6$–$C_{25}$-aryl, $C_7$–$C_{25}$-alkylaryl or $C_7$–$C_{25}$-arylalkyl which can also be derivatized, once or more than once, with nitrile or $C_1$–$C_5$-alkoxy, where one or more non-adjacent $CH_2$ groups can also be replaced by NH or O or else one or more CH groups can be replaced by N, or $R^5$ is —[$(CH_2)_m$—O—$]_o$—$R^6$ in which m is 2 or 3, o is an integer between 1 and 200 and $R^6$ is H or $C_1$–$C_5$-alkyl.

The invention relates to the use of the novel separating materials for hydrophobic interaction chromatography in association with the separation of mixtures of at least two substances, in particular for separating proteins.

The invention relates to processes for preparing separating materials for hydrophobic interaction chromatography, characterized in that oxirane-containing, activated support materials, which are disclosed in DE 43 10 964, are reacted with alcohols or phenols of the formula III

   III or with amines of the formula IV

   IV in which $R^5$ has the abovementioned meanings. The reaction with alcohols is preferably carried out in the presence of boron trifluoride etherate.

The invention relates to processes for the separation of mixtures of at least two substances, in particular for separating proteins, by means of hydrophobic interaction chromatography using the novel separating materials.

DESCRIPTION OF THE PREFERRED EMBODIMENTS

Figure 1A:
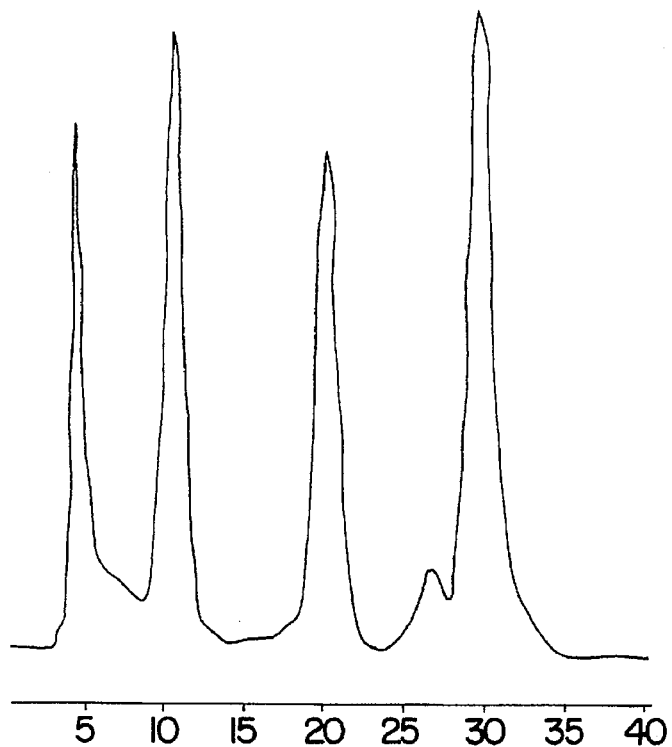
FIG. 1a depicts separation of the proteins cytochrome C, myoglobin, lysozyme and chymotrypsinogen on a novel separating material; for comparison.

The hydrophobic alkyl radicals or aryl radicals, $R^5$, are present as substituents of poly(meth)acrylates which are grafted onto a hydroxyl-group containing basal support. In this context, the $R^5$ radicals are the hydrophobic substituents which are known to the person skilled in the art for the purpose of hydrophobic chromatography (i.e. RP chromatography and, in particular, hydrophobic interaction chromatography) and include $C_1$–$C_{20}$-alkyl, $C_6$–$C_{25}$-aryl, $C_7$–$C_{25}$-alkylaryl or $C_7$–$C_{25}$-arylalkyl which can also be derivatized, once or more than once, with nitrile or $C_1$–$C_5$-alkoxy, where one or more non-adjacent $CH_2$ groups can also be replaced by NH or O or else one or more CH groups can be replaced by N, or polyethoxy derivatives or polypropoxy derivatives. For hydrophobic interaction chromatography, preference is given to the $C_2$–$C_5$-alkyl radicals, such as ethyl, propyl, n-butyl or n-pentyl, or else branched radicals, such as i-butyl, t-butyl, i-amyl or neopentyl, and also $C_6$–$C_{14}$-aryl, such as phenyl, naphthyl, anthracyl or phenanthryl, or else $C_7$–$C_{10}$-alkylaryl or $C_7$–$C_{10}$-arylalkyl, such as benzyl.

These radicals are introduced in a polymer-analogous reaction by reacting the corresponding $R^5$—OH alcohols with oxiranes in the presence of boron trifluoroetherate. In the polymer-analogous reaction, an oxirane-containing polymer is used which is grafted, as the oxirane component, onto a hydroxyl group-containing basal support. $R^5$—OH phenols and $R^5$—$NH_2$ amines are caused to react with the oxirane component in the presence of sodium hydroxide solution. The reagents can also be interchanged: in this case, a hydroxyl group-containing support is reacted with an oxirane derivative, such as 2,3-epoxypropyl phenyl ether, in the presence of boron trifluoroetherate.

The degree of hydrophobicity can be influenced by the choice of the $R^5$ substituent and by the degree of substitution. Excess oxirane groups can be removed, in a known manner, by treating with dilute sulfuric acid.

It is assumed that a person skilled in the art can make use of the above description to the widest possible extent even without any further explanation. For this reason, the preferred embodiments are to be regarded solely as being a descriptive disclosure which is no way limiting.

The complete disclosures of all applications, patents and publications listed hereinbefore and hereinafter, and of the corresponding application DE 43 23 913, filed on 16 Jul. 1993, are incorporated into this application by reference.

EXAMPLES

Example 1

Preparation of an Oxirane-activated Support, Proceeding from Fractogel®-TSK HW 65 (S)

2 g of ammonium cerium(IV) nitrate (dissolved in 25 ml of 2M $HNO_3$) are mixed, at room temperature and while stirring vigorously, into a suspension consisting of 50 ml of sedimented Fractogel®TSK HW65 (S) and 25 ml of water. After 1 minute, a solution of 3 g of (2,3-epoxypropyl) methacrylate in 30 ml of dioxane is added. The mixture is stirred for a further 3 hours.

The reaction suspension is then washed, firstly with distilled water and then with a 0.05M solution of EDTA.

Example 2

Synthesis of an n-butyl-substituted Support Material 50 g of dry gel, prepared in accordance with Example 1, are suspended in 250 ml of 1,4-dioxane and 50 ml of 1-butanol are added. 30 ml of boron trifluoride-ethyl ether complex are then added and the solution is stirred at room temperature for one hour. After that, the reaction product is filtered off with suction and washed with acetone and water.

Example 3

Synthesis of a Benzyl-substituted Support Material

A benzyl-substituted support material is prepared by proceeding in accordance with the instructions in Example 2 but employing benzyl alcohol in place of 1-butanol.

Example 4

Synthesis of a Phenyl-substituted Support Material 100 ml of Fractogel-epoxytentacle gel are suspended in a solution consisting of 0.6M NaOH and 0.5M phenol. The solution is stirred at 40° C. for 12 hours. The material is then filtered off with suction and slowly stirred at 40° C. for 2 hours in a 0.5M solution of sulfuric acid. After that, washing takes place with 0.25M phosphate buffer (pH 7) until neutrality is reached, and then with water.

Example 5

Variant for Synthesizing a Phenyl-substituted Support Material 25 ml of oxirane-containing gel, prepared in accordance with Example 1, are treated with 100 ml of 0.5M sulfuric acid at 40° C. for 2 hours, resulting in production of the diol derivative. The latter is washed several times with dioxane and suspended in 25 ml of dry dioxane. The suspension is transferred to a 100 ml Erlenmeyer flask containing a drying tube, and 3 ml of $BF_3$-etherate, and then 10 ml of 2,3-epoxypropyl phenyl ether, are pipetted in and the whole is shaken at room temperature for 45 min. The product is washed three times with dioxane and then with water.

Example 6

Synthesis of an (Aminobutyl)-substituted Support Material 100 ml of an aqueous solution consisting of 0.2M n-butylamine and 0.2M sodium carbonate buffer (pH=11) are added to 50 ml of a gel which has been prepared in accordance with Example 1. The solution is stirred at 40° C. for 24 hours. The material is then filtered off with suction and slowly stirred, at 40° C. for 2 hours, in a 0.5M solution of sulfuric acid. After that, washing takes place with 0.25M phosphate buffer (pH 7) until neutrality is reached, and then with water.

Example 7

Synthesis of a Polyethylene Glycol-substituted Support Material 100 ml of an aqueous solution consisting of 20 g of polyethylene glycol (PEG 6000) and 0.3M sodium carbonate buffer (pH=13) are added to 50 ml of a gel which has been prepared in accordance with Example 1. The suspension is stirred at 40° C. for 24 hours. The material is then filtered off with suction and slowly stirred, at 40° C. for 2 hours, in a 0.5M solution of sulfuric acid. After that, washing takes place with 0.25M phosphate buffer (pH 7) until neutrality is reached, and then with water.

Application Example A

Separation of Proteins on an n-butyl-substituted Support Material

Support material, which has been prepared in accordance with Example 2, is packed into a SuperFormance® glass column (50×10 mm) and equilibrated with the loading buffer (1.8M $(NH_4)_2SO_4$ in 20 mM sodium phosphate buffer, pH 7.0). A mixture containing cytochrome, myoglobin, lysozyme and chymotrypsinogen (4 mg/ml in each case) is loaded (200 µl) onto the column. The latter is then eluted at a flow rate of 1 ml/min with a gradient of from 1.8M to 0M $(NH_4)_2SO_4$ in 20 mM sodium phosphate buffer, pH 7.0 (duration, 30 minutes). The elution diagram is measured at 280 nm by photometry.

The four proteins are separated completely (see FIG. 1a).

Application Example B

Separation of Proteins on a Benzyl-substituted Support Material

Support material, which has been prepared in accordance with Example 3, is packed into a SuperFormance® glass column (50×10 mm). Sample and chromatography conditions are the same as described in Application Example A.

The four proteins are separated completely on this material as well; the elution diagram is similar to that obtained in Application Example A.

Comparison Example C

Separation of Proteins on an n-butyl-substituted Support Material from the State of the Art Commercially obtainable support material (n-butyl-substituted cross-linked polymethacrylate) is packed into a SuperFormance® glass column (50×10 mm). Sample and chromatography conditions are the same as described in Application Example A.

Figure 1B:
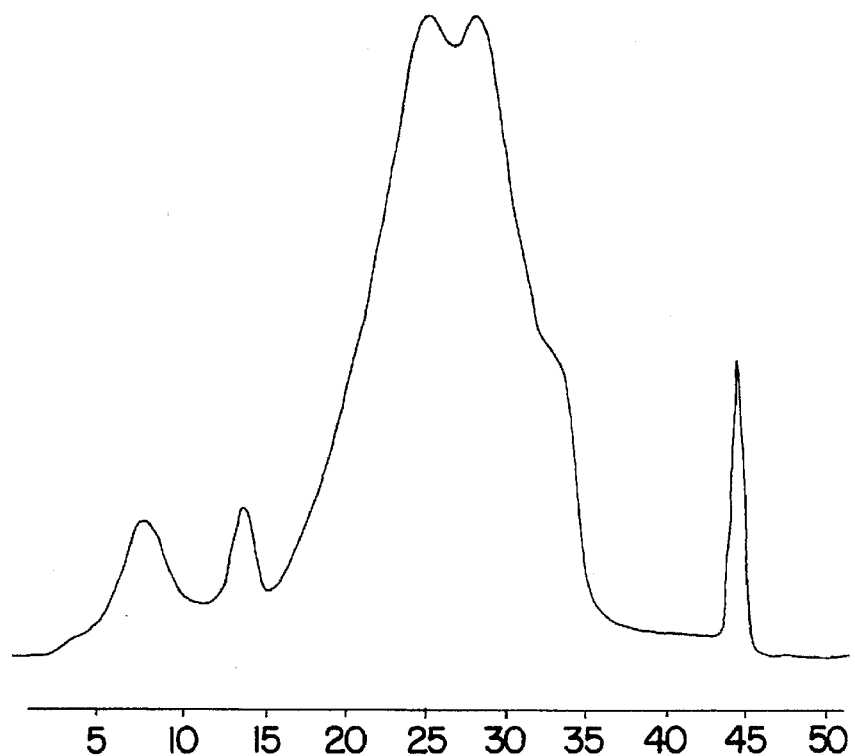
FIG. 1b shows separation of the same mixture on a material which is known from the state of the art.

In contrast to Application Example A, the four proteins are not separated completely; see FIG 1b.

This effect is surprising since the separating materials used in Application Example A and Comparison Example C possess a very similar basal support (cross-linked polymethacrylate).

Comparison Example D

Separation of Proteins on a Benzyl-substituted Support Material from the State of the Art Commercially obtainable support material (benzyl-substituted cross-linked agarose) is packed into a SuperFormance® glass column (50×10 mm). Sample and chromatography conditions are the same as described in Application Example A.

In contrast to Application Example B, the four proteins are not completely separated.

I claim:

1. A separating material for hydrophobic chromatography based on a hydroxyl group-containing basal support on the surface of which polymers are covalently bonded, wherein:

a) the basal support contains aliphatic hydroxyl groups,
   b) the covalently bonded polymers are bonded to the basal support by way of a terminal monomer unit,
   c) the polymers contain monomer units of the formula II,
   d) the monomer units are linked linearly,

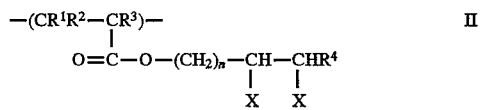

in which $R^1$, $R^2$ and $R^3$ are, independently of each other, H or $CH_3$, $R^4$ is H, $C_1$–$C_5$-alkyl or $C_6$–$C_{12}$-aryl, n is an integer between 1 and 5, one X radical is OH and the other X radical is Z—$R^5$, Z is O or NH, and $R^5$ is $C_1$–$C_{20}$alkyl, $C_6$–$C_{25}$-aryl, $C_7$–$C_{25}$-alkylaryl or $C_7$–$C_{25}$-arylalkyl which is optionally derivatized, once or more than once, with nitrile or $C_1$–$C_5$-alkoxy, where one or more non-adjacent $CH_2$ groups are optionally replaced by NH or O or else one or more CH groups are optionally replaced by N, or $R^5$ is —[$(CH_2)_m$—O—$]_o$—$R^6$ in which m is 2 or 3, o is an integer between 1 and 200 and $R^6$ is H or $C_1$–$C_5$-alkyl.

2. The separating material of claim 1, wherein $R^5$ is $C_2$–$C_5$-alkyl, $C_6$–$C_{14}$-aryl or $C_7$–$C_{10}$-alkaryl.

3. The separating material of claim 1, wherein $R^5$ is ethyl, propyl, n-butyl, n-pentyl, i-butyl, t-butyl, i-amyl, neo-pentyl, phenyl, naphthyl, anthracyl, phenanthryl or benzyl.

4. The separating material of claim 1, wherein Z is 0 and $R^5$ is propyl.

5. The separating material of claim 1, wherein Z is 0 and $R^5$ is benzyl.

6. A process for preparing a separating material for hydrophobic interaction chromatography, comprising reacting an activated support material consisting of a hydroxyl group-containing basal support onto which oxirane-derivatized poly(meth)acrylates are grafted, with alcohols or phenols of the formula III $$R^5\text{—OH} \qquad \text{III}$$

or with amines of the formula IV $$R^5\text{—}NH_2 \qquad \text{IV}$$

in which $R^5$ has the meanings given in claim 1.

7. The process of claim 6, wherein the activated support material is reacted with an alcohol of the formula III in the presence of boron trifluoride etherate.

8. A process for the chromatographic separation of a mixture of at least two substances by chromatographically separating with a separating material according to claim 1.

9. The process of claim 8, wherein the two substances separated are proteins.

10. The process of claim 8, wherein the chromatographic separation is by hydrophobic interaction chromatography.

* * * * *